US011967823B2

(12) United States Patent
Lu et al.

(10) Patent No.: US 11,967,823 B2
(45) Date of Patent: Apr. 23, 2024

(54) METHOD FOR MONITORING SHORT-TERM VOLTAGE STABILITY OF POWER SYSTEM (71) Applicants: TSINGHUA UNIVERSITY, Beijing (CN); ELECTRIC POWER RESEARCH INSTITUTE OF STATE GRID LIAONING ELECTRIC POWER CO., LTD., Liaoning (CN); STATE GRID CORPORATION OF CHINA, Beijing (CN)

(72) Inventors: Chao Lu, Beijing (CN); Yonghong Luo, Beijing (CN); Xiaohua Zhang, Beijing (CN); Changyou Feng, Beijing (CN); Fangwei Duan, Beijing (CN); Yingxuan Yang, Beijing (CN); Ruitong Liu, Beijing (CN); Yue Han, Beijing (CN)

(73) Assignees: TSINGHUA UNIVERSITY, Beijing (CN); ELECTRIC POWER RESEARCH INSTITUTE OF STATE GRID LIAONING POWER CO., LTD., Shenyang (CN); STATE GRID CORPORATION OF CHINA, Beijing (CN)

( * ) Notice: Subject to any disclaimer, the term of this patent is extended or adjusted under 35 U.S.C. 154(b) by 372 days.

(21) Appl. No.: 17/345,214

(22) Filed: Jun. 11, 2021

(65) Prior Publication Data
US 2021/0391723 A1 Dec. 16, 2021

(30) Foreign Application Priority Data

Jun. 12, 2020 (CN) .......................... 202010537174.7

(51) Int. Cl.
*H02J 3/24* (2006.01)
*G06N 3/10* (2006.01)
(Continued)

(52) U.S. Cl.
CPC .................. *H02J 3/24* (2013.01); *G06N 3/10* (2013.01); *G06Q 50/06* (2013.01); *G06N 3/045* (2023.01); *G06N 3/08* (2013.01); *H02J 2203/20* (2020.01)

(58) Field of Classification Search
CPC .......... H02J 3/24; H02J 2203/20; H02J 3/001; H02J 3/00; G06N 3/10; G06N 3/045;
(Continued)

(56) References Cited

U.S. PATENT DOCUMENTS

2014/0351010 A1* 11/2014 Kong ................. G06Q 30/0201 705/7.29
2016/0072287 A1* 3/2016 Jia ........................ H02J 3/0073 700/295

FOREIGN PATENT DOCUMENTS

CN 107482621 12/2017

OTHER PUBLICATIONS

CNIPA, First Office Action for CN Application No. 202010537174.7, dated Jun. 30, 2021.

* cited by examiner

*Primary Examiner* — Mohammad Ali
*Assistant Examiner* — Saad M Kabir
(74) *Attorney, Agent, or Firm* — Hodgson Russ LLP (57) ABSTRACT The disclosure provides a method for monitoring a short-term voltage stability of a power system. The method includes: obtaining a topology and time series of a current power system; inputting the topology and the time series of the current power system into a trained spatial-temporal graph network model, the trained spatial-temporal graph network model being obtained by classification learning on a spatial-temporal graph network model based on a simulation sample dataset; outputting a status of the short-term voltage stability of the power system; and sending an alarm (Continued)

signal in response to outputting an unstable status of the short-term voltage stability of the power system.

7 Claims, 5 Drawing Sheets

(51) Int. Cl.
*G06Q 50/06* (2012.01)
*G06N 3/045* (2023.01)
*G06N 3/08* (2023.01)

(58) Field of Classification Search
CPC .......... G06N 3/08; G06Q 50/06; Y02E 60/00; Y04S 40/20; G06F 30/18; G06F 30/20; G06F 30/27; G06F 2113/04
See application file for complete search history.

METHOD FOR MONITORING SHORT-TERM VOLTAGE STABILITY OF POWER SYSTEM

CROSS-REFERENCE TO RELATED APPLICATION

This application claims priority to Chinese Patent Application No. 202010537174.7, filed Jun. 12, 2020, the entire disclosure of which is incorporated herein by reference.

FIELD

The disclosure relates to a field of stability analysis and assessment of a power system, and more particularly to a method for monitoring short-term voltage stability of a power system.

BACKGROUND

The power system operates in an increasingly severe environment with increasing of power loads year by year, integration of renewable energy sources, and gradual implementation of power markets. When the power system suffers from a large disturbance such as equipment failure or short circuit, short-term voltage instability may occur in the power system, thereby causing a serious blackout accident. Therefore, after the disturbance occurs in the power system, it should be determined quickly and accurately whether the power system is stable, which is beneficial for an operator to understand the stability status of the system and make a corresponding control measure in time for an unstable condition.

SUMMARY

A method for monitoring short-term voltage stability of a power system provided in the disclosure includes: obtaining a topology and post-fault time series of a current power system; inputting the topology and the time series of the current power system into a trained spatial-temporal graph network model, the trained spatial-temporal graph network model being obtained by classification learning on a spatial-temporal graph network model based on a simulation sample set; outputting a status of the short-term voltage stability of the power system; and sending an alarm signal in response to outputting an unstable status of the short-term voltage stability of the power system.

BRIEF DESCRIPTION OF THE DRAWINGS

In order to explain the technical solutions in embodiments of the disclosure or the related art more clearly, description will be briefly made below to the attached drawings used in the embodiments. Obviously, the attached drawings in the following description are some embodiments of the disclosure. For skilled in the art, other attached drawings may be obtained based on these attached drawings without paying creative labor.

DETAILED DESCRIPTION

In order to make objectives, technical solutions and advantages of embodiments of the disclosure clearer, clear and complete description will be made to the technical solution in embodiments of the disclosure with reference to the attached drawings. Obviously, the described embodiment is a part of embodiments of the disclosure, but not all embodiments. Based on the embodiment of the disclosure, all other embodiments obtained by the skilled in the art without creative labor belong to the protection scope of the disclosure.

Figure 1:
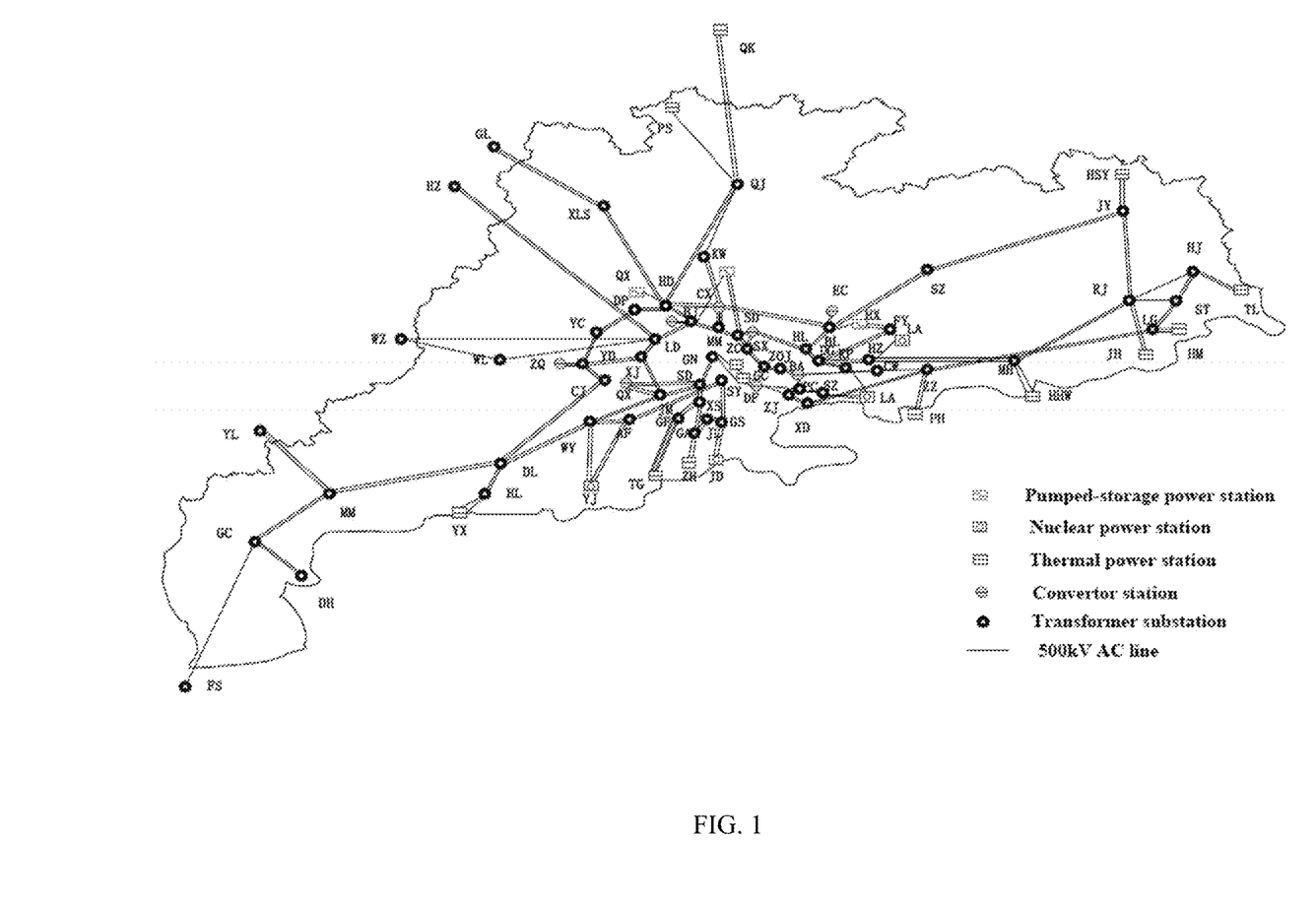
FIG. 1 is a schematic diagram illustrating a power grid according to one embodiment of the disclosure.

FIG. 1 is a schematic diagram illustrating a power grid according to one embodiment of the disclosure. The embodiment as illustrated in FIG. 1 may be one application embodiment provided by embodiments of the disclosure.

Figure 2:
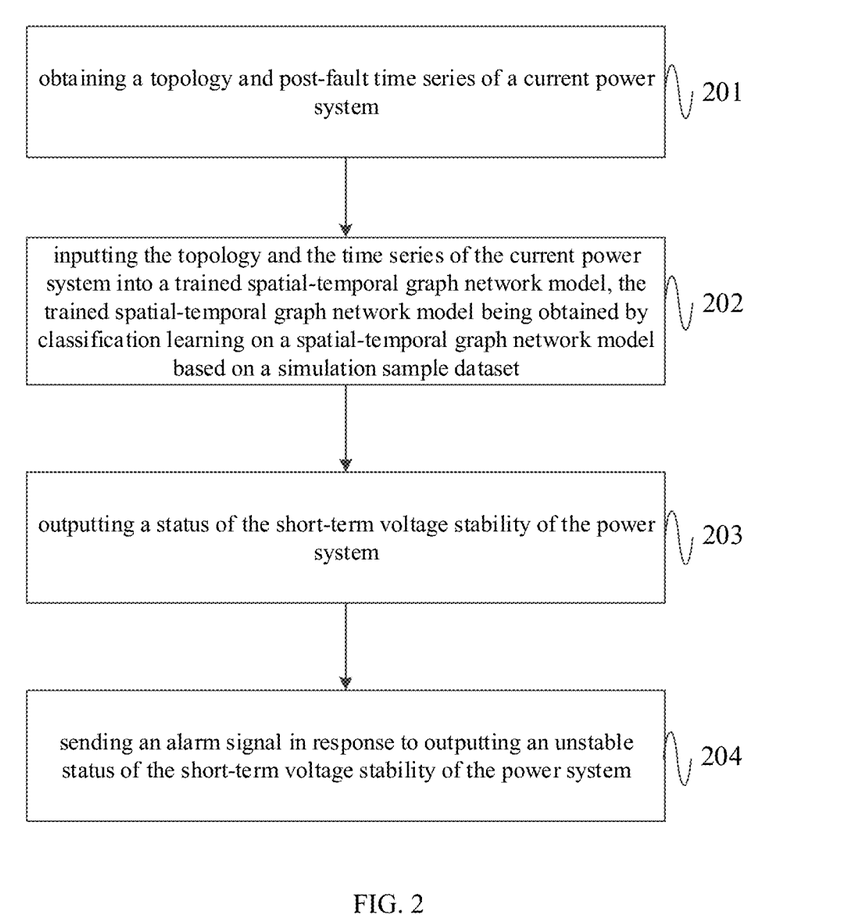
FIG. 2 is a flow chart illustrating a method for monitoring short-term voltage stability of a power system according to the embodiment of the disclosure.

FIG. 2 is a flow chart illustrating a method for monitoring short-term voltage stability of the power system according to one embodiment of the disclosure. As illustrated in FIG. 2, the method for monitoring short-term voltage stability of power system includes the following steps.

In step 201, a topology and post-fault time series of a current power system are obtained.

In step 202, the topology and the time series of the current power system are inputted into a trained spatial-temporal graph network model. The trained spatial-temporal graph network model is obtained by classification learning on the spatial-temporal graph network based on a simulation sample dataset.

In step 203, a status of the short-term voltage stability of the power system is outputted.

In step 204, an alarm signal is sent in response to outputting an unstable status of the short-term voltage stability of the power system.

In some embodiments of the disclosure, phasor measurement units need to be deployed first to monitor the state of the power system. When the monitored power system suffers an unpredictable fault, the phasor measurement unit of each substation in the power system can obtain post-fault voltage magnitude time series V, post-fault active power injection time series P, and post-fault reactive power injection time series Q in real time. In addition, the current topology W of the power system needs to be obtained.

Further, in step 202, the time series and the topology are inputted into the trained spatial-temporal graph network model. The spatial-temporal graph network model is obtained by classification learning of the spatial-temporal graph network based on the simulation sample dataset. Finally, the status of the short-term voltage stability of the power system is outputted by performing the action in step 203. An alarm signal is sent out when the power system is unstable, such that a corresponding measure may be taken as soon as possible.

With the method for monitoring the short-term voltage stability of the power system by employing the spatial-temporal graph network model, the spatial information is extracted by performing graph convolution, and the topology of the power system is also taken as input, which may better adapt to the topology changes and has better reliability and adaptability.

On the basis of the above embodiments, before obtaining the topology and the time series of the current power system, the method also includes: constructing the simulation sample dataset; constructing the spatial-temporal graph network model; and training the spatial-temporal graph network model based on the simulation sample dataset.

It may be known from contents of the above embodiments that the embodiment of the disclosure provides the trained spatial-temporal graph network model for monitoring the short-term voltage stability of the power system. Before training the spatial-temporal graph network model, the simulation sample dataset and the spatial-temporal graph network model need to be constructed, and the spatial-temporal graph network model is trained based on a preset way.

On the basis of the above embodiment, constructing the simulation sample dataset includes: constructing the operation mode set by collecting typical operation modes from the operation database of the power system, constructing the fault set by setting different faults, and constructing the topology set by setting different topology changes of the power system; and performing time domain simulation on the power system under multiple operation modes, faults and topologies for multiple times by employing an electromechanical transient simulation software, to obtain the simulation sample dataset.

In the embodiment of the disclosure, each simulation needs to record voltage magnitude time series V, active power injection time series P, reactive power injection time series Q of the stations in the studied power system within a duration time Δt after the fault is cleared, and the topology W of the studied power system. In addition, the final voltage state C of the power system is recorded. These information (V, P, Q, W; C) constitute a simulation sample. In the embodiment of the disclosure, the number of nodes in the monitored power system is set as n. The length of the time series after fault clearing is N. The dimension of the time series V P and Q after fault clearing in the simulation sample is n*N. The topology W of the power system is represented by a node admittance matrix, and the dimension is n*n. K simulation samples are obtained after performing domain simulation for K times, thereby constituting the simulation sample dataset for subsequent learning and testing.

On the basis of the above embodiments, constructing the spatial-temporal graph network model includes: constructing a spatial-temporal information incorporation module for extracting spatial-temporal characteristics, the spatial-temporal information incorporation module being formed by stacking several spatial-temporal information incorporation blocks, in which a graph convolutional layer of the spatial-temporal information incorporation block is configured to extract spatial information, and a one-dimensional temporal convolutional layer of the spatial-temporal information incorporation block is configured to extract temporal information; then constructing a node layer block for weighting and summing data of these dimensions obtained by each node based on the spatial-temporal characteristics to obtain a node representation corresponding to each node; and constructing a system layer block for standardizing the node representation corresponding to each node, taking an absolute value of the node representation, multiplying the absolute value with a system layer parameter processed by a SoftMax function, and outputting an assessment result by the SoftMax function.

Figure 3:
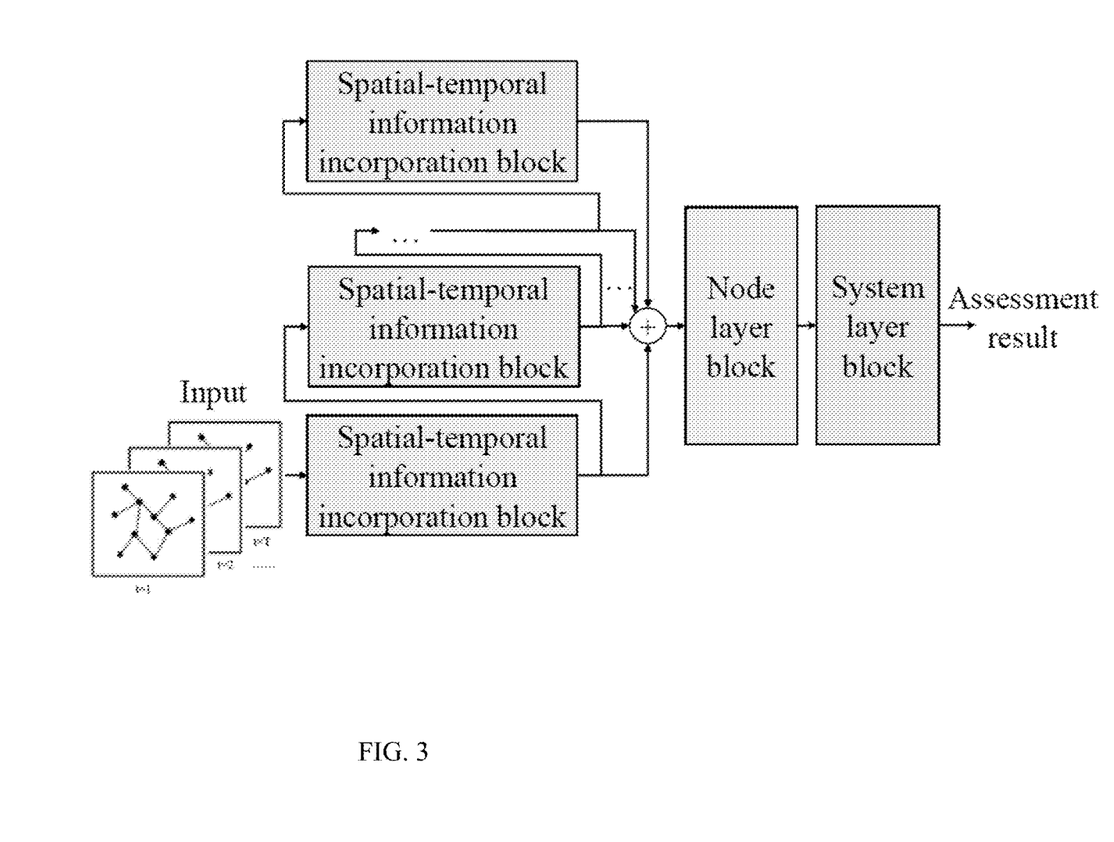
FIG. 3 is a block diagram illustrating a spatial-temporal graph network model according to the embodiment of the disclosure.
Figure 4:
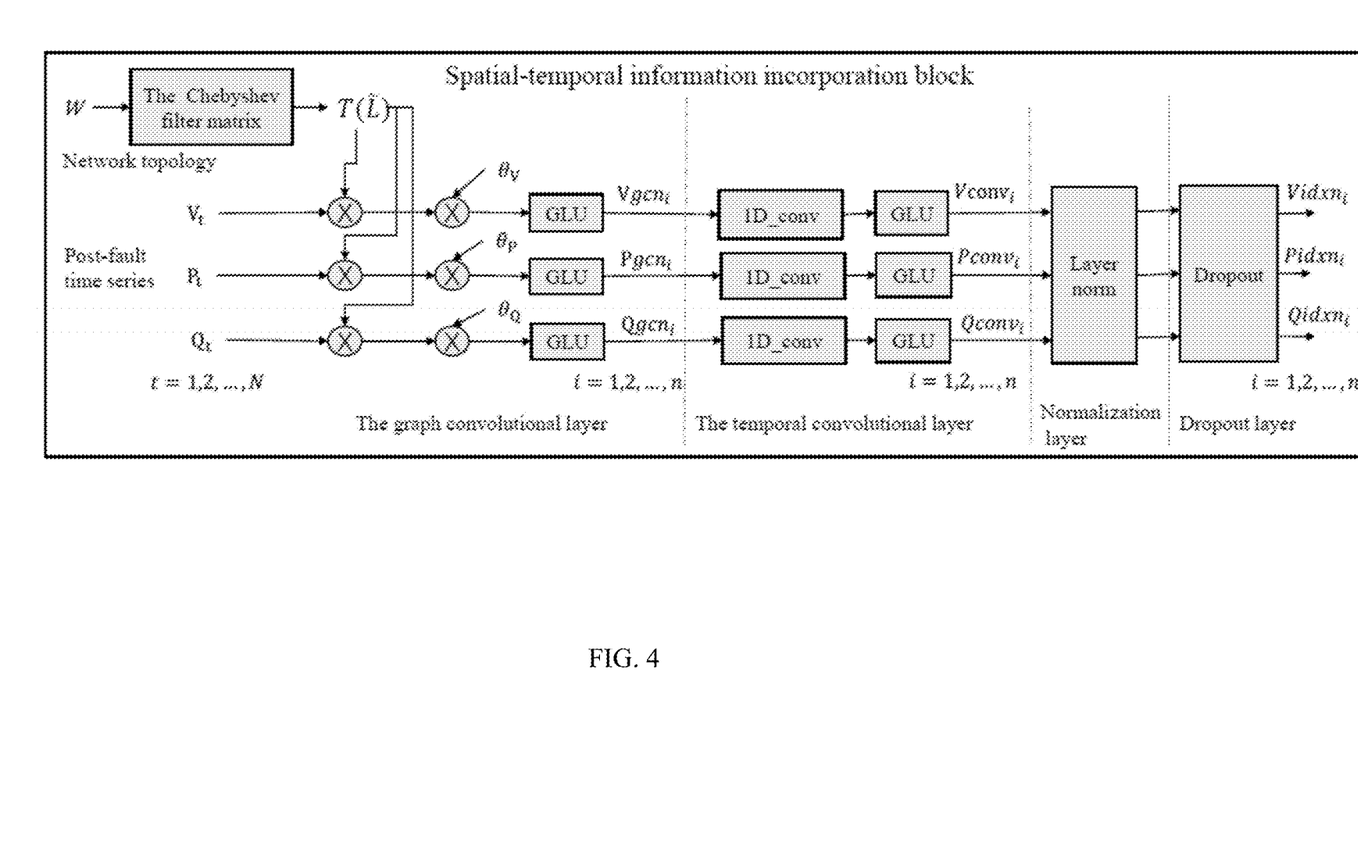
FIG. 4 is a block diagram illustrating a spatial-temporal information incorporation block according to the embodiment of the disclosure.

FIG. 3 is a block diagram illustrating a spatial-temporal graph network model according to some embodiments of the disclosure. FIG. 4 is a block diagram illustrating a spatial-temporal information incorporation block according to some embodiments of the disclosure. As illustrated in FIG. 3 and FIG. 4, the spatial-temporal graph network model provided by the disclosure includes a spatial-temporal information incorporation module, a node layer block, and a system layer block.

The input of the spatial-temporal graph network model may be information as described above from time point t=1 to time point t=T.

The output of the spatial-temporal graph network model may be an assessment result, which may be a short-term voltage stability status or a short-term voltage instability status.

The spatial-temporal information incorporation module is formed by stacking multiple spatial-temporal information incorporation blocks, and takes fusion information of each spatial-temporal information incorporation block as the output of the module. Each spatial-temporal information incorporation block includes a graph convolutional layer, a one-dimensional temporal convolutional layer, a normalization layer, and a dropout layer.

A Chebyshev graph convolution is employed in the graph convolutional layer. Graph convolution is an effective method for extracting spatial information from data with a graph structure.

The Chebyshev graph convolution is a graph convolution method based on spectrum theory. In the spectrum theory, a mathematical representation of the graph is a normalized Laplacian matrix, which is defined as:

$$L = I_n - D^{-1/2} W D^{-1/2},$$

where, W represents the topology of the studied power system, i.e., a node admittance matrix, representing a connection relationship among nodes in the graph, D represents a diagonal matrix of corresponding nodal degrees for W, and $I_n$ represents an identity matrix. The normalized Laplacian matrix L has real positive semi-definite properties, which may be factored as: $L = U \Delta U^T$, where, $\Delta$ represent a diagonal matrix composed of eigenvalues, and U represents a matrix of eigenvectors ordered by eigenvalues. A Chebyshev filter is configured to perform graph convolution on an input signal such as the voltage magnitude V, the injection active power P, and the injection reactive power Q, which is represented as:

$$P * Gg_\theta = \sum_{i=1}^{K} \theta_i T_i(\tilde{L}) P;$$

$$P = [p_1 \quad p_2 \quad \ldots \quad p_n]^T;$$

$$Q * Gg_\theta = \sum_{i=1}^{K} \theta_i T_i(\tilde{L}) Q;$$

$$Q = [q_1 \quad q_2 \quad \ldots \quad q_n]^T;$$

$$V * Gg_\theta = \sum_{i=1}^{K} \theta_i T_i(\tilde{L}) V;$$

$$V = [v_1 \quad v_2 \quad \ldots \quad v_n]^T; \text{ and}$$

$$T_i(\tilde{L}) = 2\tilde{L} T_{i-1}(\tilde{L}) - T_{i-2}(\tilde{L}), \quad \tilde{L} = 2L/\lambda_{max} - I_n, \quad T_0(\tilde{L}) = 1, \text{ and } T_1(\tilde{L}) = \tilde{L},$$

where, $\lambda_{max}$ represents a maximum eigenvalue obtained after performing eigenvalue decomposition on L, $T_k(\tilde{L})$ represents a Chebyshev matrix for implementing graph convolution, K represents a Chebyshev order, and θ represents parameters to be learned in the graph convolution. $P\_gcn_i$, $Q\_gcn_i$, and $V\_gcn_i$ represent series after passing the graph convolutional layer, and i=1, 2, . . . , n.

Further, after the spatial information is extracted by the graph convolutional layer, the one-dimensional temporal convolutional layer is configured to extract the temporal information based on a formula of:

$Pindex\_node_i=1D\_conv(P\_gcn_i);$ $P\_gcn_i=[p\_gcn_1 p\_gcn_2 \ldots P\_gcn_N]i=1,2,3,\ldots,n;$ $Qindex\_node_i=1D\_conv(Q\_gcn_i);$ $Q\_gcn_i=[q\_gcn_1 q\_gcn_2 \ldots q\_gcn_N];$ $Vindex\_node_i=1D\_conv(V\_gcn_i);$ and $V\_gcn_i=[v\_gcn_1 v\_gcn_2 \ldots v\_gcn_N].$ It should be noted that, in some embodiments of the disclosure, in order to prevent over-fitting, the normalization layer and the dropout layer are employed to improve the performance of the model.

Further, in order to extract the spatial-temporal characteristics from multiple perceptual domains, multiple spatial-temporal information incorporation blocks are stacked to obtain fusion information, and the fusion information is employed as the output of the final spatial-temporal information incorporation module. The detailed implementation is based on a formula of:

$$P\_indexz_i = \sum_{k=1}^{L_c} Pindex\_node_{i,k};$$

$$Q\_indexz_i = \sum_{k=1}^{L_c} Qindex\_node_{i,k}; \text{ and}$$

$$V\_indexz_i = \sum_{k=1}^{L_c} Vindex\_node_{i,k}$$

$i = 1, 2, 3, \ldots, n,$ where, $Pindex\_node_{i,k}$, $Qindex\_node_{i,k}$, and $Vindex\_node_{i,k}$ represent the representations of the $i^{th}$ node obtained by stacking k spatial-temporal information incorporation blocks, $P\_indexz_i$, $Q\_indexz_i$, and $V\_indexz_i$ represents the representation of the $i^{th}$ node after transformation by the spatial-temporal information incorporation module, and $L_c$ represents the number of stacked spatial-temporal information incorporation blocks.

The node layer block is configured to weight and sum the data with multiple dimensions obtained from each node above to obtain a corresponding node representation for the node. The node representation is denoted by:

$SVS\_node = \Psi_1 * P\_indexz_i + \Psi_2 * Q\_indexz_i + \Psi_3 * V\_indexz_i,$ $i=1,2,3,\ldots,n$ where, $SVS\_node_i$ represents the node representation of an observed field, and $\psi_1$, $\psi_2$, and $\psi_3$ represent parameters in the node layer block.

On the basis of the above embodiments, the node representation corresponding to each node is standardized, an absolute value of the node representation is taken, the absolute value is multiplied with a system layer parameter processed by a SoftMax function, and an assessment result by the SoftMax function is outputted. The assessment result is represented by:

$SVS\_system=\text{soft max}(\text{soft max}(S)^T \cdot SVS\_NODE);$
and $SVS\_NODE=[SVS\_node_1 \ldots SVS\_node_n],$ where, S represents the system layer parameter, SVS_system represents the assessment result of the short-term voltage stability, and SVS_NODE represents a node representation of each station integrating with the spatial-temporal characteristics and given by the node layer block.

On the basis of the above embodiments, training the spatial-temporal graph network model based on the simulation sample dataset includes: dividing the simulation sample dataset into a first sample dataset and a second sample dataset; training the spatial-temporal graph network model by a stochastic gradient descent algorithm based on the first sample dataset, and testing the spatial-temporal graph network model by the second sample dataset; and obtaining the trained spatial-temporal graph network model in a case that a test accuracy is greater than a preset threshold.

In the embodiment of the disclosure, different hyper parameters, such as a training epoch and a learning rate, are selected in the training process to train and test the spatial-temporal graph network model. When the test accuracy reaches the preset standard, the corresponding spatial-temporal graph network model and the parameters are saved to obtain the trained spatial-temporal graph network model.

On the basis of the above embodiments, the method also includes: determining an influence of each node of the power system on the short-term voltage stability based on the parameters of system layer in the trained spatial-temporal graph network model.

Figure 5:
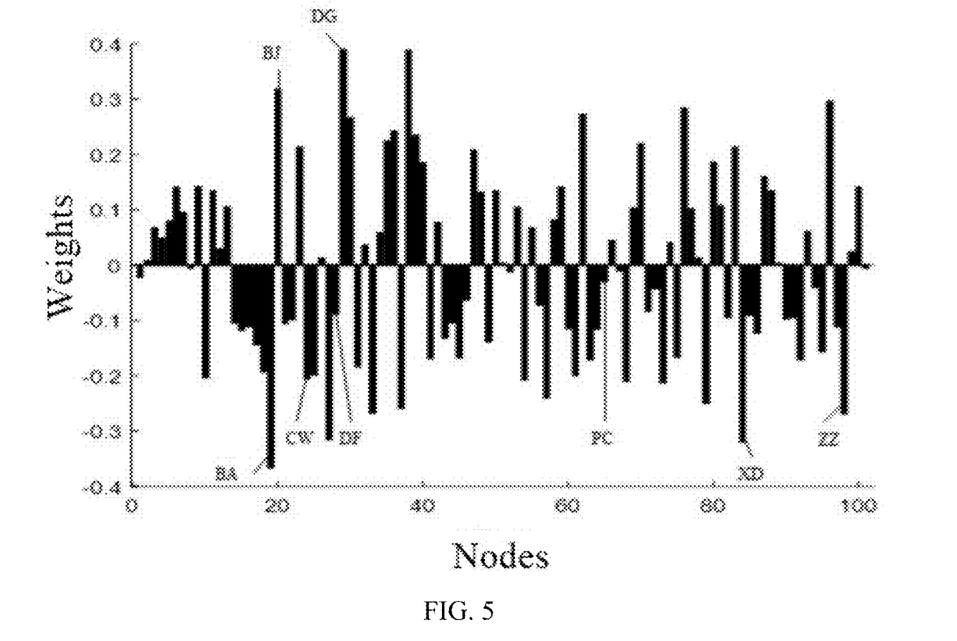
FIG. 5 is a schematic diagram illustrating parameters in a system layer of a trained spatial-temporal graph network model according to the embodiment of the disclosure.
Figure 6:
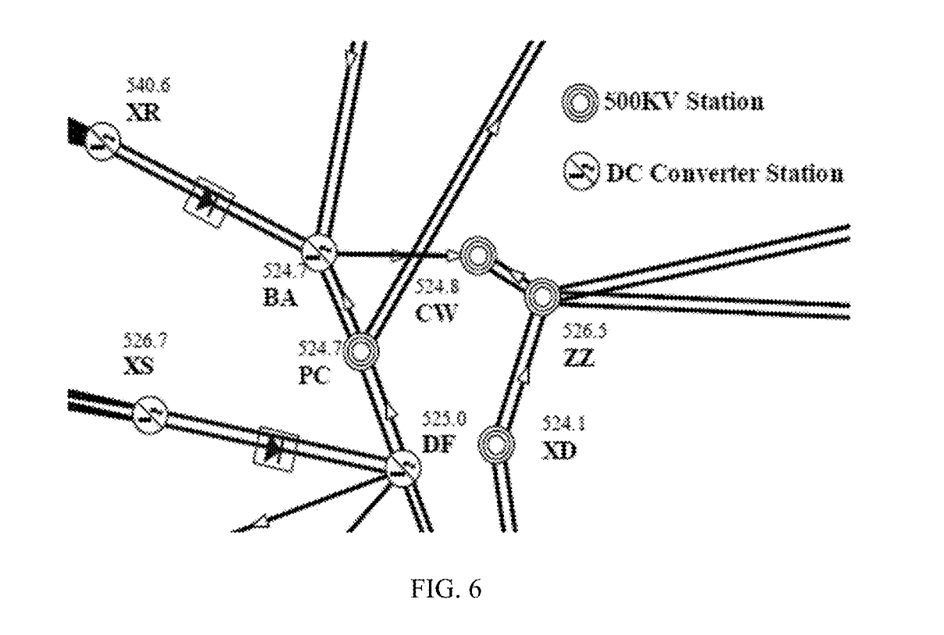
FIG. 6 is a schematic diagram illustrating stations in multi-DC infeed region involved in interpretation of system layer parameters according to the embodiment of the disclosure.

In some embodiments of the disclosure, parameters in the trained spatial-temporal graph network model may provide useful information about the observed power system, such as the parameters in the system layer. When a parameter of system layer corresponding to a certain station is positive, it shows that the station plays a positive role in the short-term voltage stability. When a parameter of system layer corresponding to a certain station is negative, it shows that the station plays a negative role in the short-term voltage stability. The parameter of system layer may be taken as a reference for the station configuring the reactive power source, such as a parallel capacitor and statcom. FIG. 5 is a schematic diagram illustrating the parameters of system layer in a trained spatial-temporal graph network model according to some embodiments of the disclosure. As illustrated in FIG. 5, a station with a lowest system layer parameter is a BA station. In fact, the system layer parameters of several stations adjacent to this station in space, including XD, CW, ZZ, PC and DF stations, are all negative, and it shows that these stations have a negative impact on the short-term voltage stability. FIG. 6 is a schematic diagram illustrating stations in multi-DC infeed region involved in the interpretation of system layer parameters according to some embodiments of the disclosure. As illustrated in FIG. 6, the BA, XD, CW, ZZ, PC and DF stations are located in the multi-DC infeed region, and the interaction between an AC (alternating current) system and a DC (direct current) system causes a weak voltage stability in the DC receiving region, which is consistent with a law reflected by the system layer parameter. The system layer parameter corresponding to the DG station is the highest, the DG station is equipped with a statcom with 200 Mvar, and there is a power station with an excitation regulator nearby. As we all know, the statcom and the power station equipped with the excitation regulator have positive influence on the voltage stability. The law embodied by the system layer parameter in some embodiments of the disclosure is consistent with the conclusion, which shows the effectiveness of the system layer parameters.

Finally, it should be noted that, the above embodiments merely illustrate the technical solution of the disclosure, but not to limit the disclosure. Although the disclosure has been described in detail with reference to the foregoing embodiments, the skilled in the art should understand that the technical solutions described in the foregoing embodiments may still be modified, or some of the technical features may be equivalently replaced. However, these modifications or substitutions do not make the essence of the corresponding technical solutions deviate from the scope of the technical solutions of each embodiment of the disclosure.

What is claimed is:

1. A method for monitoring short-term voltage stability of a power system, comprising:
    obtaining a topology and post-fault time series of a current power system;
    inputting the topology and the time series of the current power system into a trained spatial-temporal graph network model, the trained spatial-temporal graph network model being obtained by classification learning on a spatial-temporal graph network model based on a simulation sample dataset;
    outputting a status of the short-term voltage stability of the power system; and
    sending an alarm signal in response to outputting an unstable status of the short-term voltage stability of the power system;
    wherein before obtaining the topology and the time series of the current power system, the method further comprises:
        constructing the simulation sample dataset;
        constructing the spatial-temporal graph network model; and
        training the spatial-temporal graph network model based on the simulation sample dataset;
    wherein constructing the spatial-temporal graph network model comprises:
        constructing a spatial-temporal information incorporation module for extracting spatial-temporal characteristics, the spatial-temporal information incorporation module being formed by stacking a plurality of spatial-temporal information incorporation blocks, wherein a graph convolutional layer of the spatial-temporal information incorporation block is configured to extract spatial information, and a one-dimensional temporal convolutional layer of the spatial-temporal information incorporation block is configured to extract temporal information;
        constructing a node layer block for weighting and summing data of a plurality of dimensions obtained by each node based on the spatial-temporal characteristics to obtain a node representation corresponding to each node; and
        constructing a system layer block for standardizing the node representation corresponding to each node, taking an absolute value of the node representation, multiplying the absolute value with a system layer parameter processed by a softmax function, and outputting an assessment result by the softmax function.

2. The method of claim 1, wherein constructing the simulation sample dataset comprises:
    constructing an operation mode set by collecting typical operation modes from an operation database of the power system, constructing a fault set by setting different faults, and constructing the topology set by setting different topological changes of the power system; and
    performing time domain simulation on the power system under a plurality of operation modes, faults, and topologies for a plurality of times by employing an electromechanical transient simulation software, to obtain the simulation sample dataset.

3. The method of claim 1, wherein training the spatial-temporal graph network model based on the simulation sample dataset comprises:
    dividing the simulation sample dataset into a first sample dataset and a second sample dataset;
    training the spatial-temporal graph network model by a stochastic gradient descent algorithm based on the first sample dataset, and testing the spatial-temporal graph network model by the second sample dataset; and
    obtaining the trained spatial-temporal graph network model in a case that a test accuracy is greater than a preset threshold.

4. The method of claim 1, further comprising:
    determining an influence of each node of the power system on the short-term voltage stability based on parameters of a system layer in the trained spatial-temporal graph network model.

5. A method for monitoring short-term voltage stability of a power system, comprising:
    obtaining a topology and post-fault time series of a current power system;
    inputting the topology and the time series of the current power system into a trained spatial-temporal graph network model, the trained spatial-temporal graph network model being obtained by classification learning on a spatial-temporal graph network model based on a simulation sample dataset;
    outputting a status of the short-term voltage stability of the power system; and
    sending an alarm signal in response to outputting an unstable status of the short-term voltage stability of the power system;
    wherein before obtaining the topology and the time series of the current power system, the method further comprises:
        constructing the simulation sample dataset;
        constructing the spatial-temporal graph network model; and
        training the spatial-temporal graph network model based on the simulation sample dataset;
    wherein training the spatial-temporal graph network model based on the simulation sample dataset comprises:
        dividing the simulation sample dataset into a first sample dataset and a second sample data set;
        training the spatial-temporal graph network model by a stochastic gradient descent algorithm based on the first sample dataset, and testing the spatial-temporal graph network model by the second sample dataset; and obtaining the trained spatial-temporal graph network model in a case that a test accuracy is greater than a preset threshold.

6. The method of claim 5, wherein constructing the simulation sample dataset comprises:

constructing an operation mode set by collecting typical operation modes from an operation database of the power system, constructing a fault set by setting different faults, and constructing the topology set by setting different topological changes of the power system; and performing time domain simulation on the power system under a plurality of operation modes, faults, and topologies for a plurality of times by employing an electromechanical transient simulation software, to obtain the simulation sample dataset.

7. The method of claim 5, further comprising:

determining an influence of each node of the power system on the short-term voltage stability based on parameters of a system layer in the trained spatial-temporal graph network model.

\* \* \* \* \*

UNITED STATES PATENT AND TRADEMARK OFFICE
CERTIFICATE OF CORRECTION

PATENT NO. : 11,967,823 B2
APPLICATION NO. : 17/345214
DATED : April 23, 2024
INVENTOR(S) : Chao Lu et al.

It is certified that error appears in the above-identified patent and that said Letters Patent is hereby corrected as shown below:

On the Title Page

Item (71) "Applicants" should read:
--TSINGHUA UNIVERSITY, Beijing (CN); ELECTRIC POWER RESEARCH INSTITUTE OF STATE GRID LIAONING ELECTRIC POWER CO., LTD., Shenyang (CN); STATE GRID CORPORATION OF CHINA, Beijing (CN)--

And

Item (73) "Assignees" should read:
--TSINGHUA UNIVERSITY, Beijing (CN); ELECTRIC POWER RESEARCH INSTITUTE OF STATE GRID LIAONING ELECTRIC POWER CO., LTD., Shenyang (CN); STATE GRID CORPORATION OF CHINA, Beijing (CN)--

Signed and Sealed this
Twenty-seventh Day of August, 2024

Katherine Kelly Vidal
*Director of the United States Patent and Trademark Office*